United States Patent
Coatesworth et al.

(10) Patent No.: US 8,857,418 B2
(45) Date of Patent: Oct. 14, 2014

(54) METHOD FOR PREPARING INTERNAL COMBUSTION ENGINE FOR SHUTDOWN TO ACHIEVE CLEAN RESTART

(75) Inventors: Timothy A. Coatesworth, Bloomfield Hills, MI (US); Joseph Roos, Livonia, MI (US); Kenneth P. DeGroot, Macomb Township, MI (US); Sashidhar Velnati, Oxford, MI (US); Goro Tamai, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 624 days.

(21) Appl. No.: 13/180,863

(22) Filed: Jul. 12, 2011

(65) Prior Publication Data

US 2013/0018564 A1 Jan. 17, 2013

(51) Int. Cl.
| | | |
|---|---|---|
| F02D 41/00 | (2006.01) | |
| F02D 41/04 | (2006.01) | |
| F02D 17/04 | (2006.01) | |
| F02D 29/02 | (2006.01) | |
| B60W 10/06 | (2006.01) | |
| B60W 20/00 | (2006.01) | |
| F02M 25/08 | (2006.01) | |
| F02M 25/07 | (2006.01) | |

(52) U.S. Cl.
CPC ............ *B60W 20/40* (2013.01); *Y02T 10/47* (2013.01); *F02D 41/0055* (2013.01); *F02D 41/042* (2013.01); *B60W 10/06* (2013.01); *B60W 20/1082* (2013.01); *F02D 17/04* (2013.01); *Y02T 10/42* (2013.01); *F02D 2041/001* (2013.01); *F02M 25/08* (2013.01); *F02M 25/0715* (2013.01); *F02D 29/02* (2013.01); *F02D 41/0002* (2013.01)
USPC ........ 123/698; 123/568.11; 123/491; 701/113

(58) Field of Classification Search
CPC .. F02D 41/0042; F02D 41/0047; F02M 7/24; F02M 25/074
USPC .................... 123/179.1, 179.16, 179.18, 491, 123/568.11, 568.14, 698, 699; 701/113
See application file for complete search history.

(56) References Cited

U.S. PATENT DOCUMENTS

| | | | | |
|---|---|---|---|---|
| 4,592,323 | A  * | 6/1986 | Vest | 123/362 |
| 7,383,119 | B2 * | 6/2008 | Lewis | 701/112 |
| 8,109,092 | B2 * | 2/2012 | Pursifull et al. | 60/607 |
| 8,146,557 | B2 * | 4/2012 | Storhok et al. | 123/179.16 |
| 8,439,002 | B2 * | 5/2013 | Pursifull et al. | 123/21 |
| 2007/0234982 | A1 * | 10/2007 | Kolmanovsky et al. | 123/90.11 |
| 2009/0095244 | A1 * | 4/2009 | Leone et al. | 123/179.16 |

* cited by examiner

Primary Examiner — John Kwon
(74) Attorney, Agent, or Firm — Ralph E Smith

(57) ABSTRACT

A method for preparing an internal combustion (IC) engine component of a hybrid automotive powertrain for shutdown so as to enable clean restart is disclosed herein. The method includes determining if the IC engine is about to enter a shutdown mode. The method includes determining a number of engine run cycles to fill an intake manifold of the IC engine with clean air, if it is determined the IC engine is about to enter the shutdown mode. The method includes running the IC engine for the determined number of cycles to fill the intake manifold of the IC engine with clean air before shutting the IC engine down.

20 Claims, 2 Drawing Sheets

METHOD FOR PREPARING INTERNAL COMBUSTION ENGINE FOR SHUTDOWN TO ACHIEVE CLEAN RESTART

FIELD

The present disclosure relates to the operation of hybrid automotive powertrains, specifically the startup and shutdown routines of internal combustion (IC) engines used in the same.

BACKGROUND

Hybrid automotive powertrains generally provide higher fuel mileage and lower emissions compared to fully internal combustion (IC) powertrains. Hybrid powertrains generally combine two or more energy sources/systems such as a battery powered electric motor and a highly efficient IC engine. On-board computer controls can be used to control when the two systems are used so as to achieve peak driving efficiency in different driving conditions.

To maximize fuel economy, it is desirable that the hybrid powertrain have the ability to rapidly stop and start the IC engine. For example, the IC engine is turned off during deceleration and restarted when the driver releases the brake or presses on the accelerator. Electrical power accumulated by the deceleration is used to restart the IC engine. However, because of the short time between stops and starts, and the degree of electrical power necessary to restart the IC engine, the IC engine is generally in an instant-off state where at least the intake manifold of the IC engine will not be clear of recirculated exhaust (exhaust gas recirculation—"EGR") or purge materials such as fuel vapor or gases. On restart, the presence of those EGR and purge material in the intake manifold can decrease overall fuel economy and increase undesirable emissions.

SUMMARY

Disclosed herein is a method for preparing an internal combustion (IC) engine component of a hybrid automotive powertrain for shutdown so as to enable clean restart. The method includes determining if the IC engine is about to enter a shutdown mode. The method includes determining a number of engine run cycles to fill an intake manifold of the IC engine with clean air, if it is determined the IC engine is about to enter the shutdown mode. The method includes running the IC engine for the determined number of cycles to fill the intake manifold of the IC engine with clean air before shutting the IC engine down.

In another aspect of this disclosure, the method further includes disconnecting exhaust gas recirculation and purge material inflow to the intake manifold before running the engine for the determined number of cycles.

In another aspect, the number of cycles is determined as a function of intake manifold size.

In another aspect, the method includes selecting the determined number of cycles as a function of the determined concentration of EGR and/or purge material.

In another aspect, the step of determining if the IC engine is about to enter the shutdown mode is performed by a control unit of the hybrid automotive powertrain.

In another aspect, the step of determining if the intake manifold is substantially empty includes determining whether an air pressure level in the intake manifold exceeds a threshold pressure level.

Disclosed herein is a hybrid automotive powertrain system. The system includes an internal combustion (IC) engine, a secondary energy source, an exhaust gas recirculation (EGR) subsystem, and a control unit. The internal combustion (IC) engine includes an intake manifold. The exhaust gas recirculation (EGR) subsystem is connected to the intake manifold. The control unit is connected to the IC engine, electric generator, and the exhaust gas recirculation subsystem and operable to control start/stop functionality of the IC engine such that when it is determined that the IC engine is about to enter a shutdown mode, the control unit is operable to run the IC engine for a determined number of cycles to fill the intake manifold with clean air before shutting the IC engine down.

In another aspect, the system further includes a sensor in the intake manifold connected to the control unit operable to determine the concentration of EGR present in the manifold at the time of the determined shutdown.

In another aspect, the control unit is further operable to select the determined number of cycles as a function of the determined concentration of EGR.

In another aspect, the secondary energy source is an electric motor/generator and power from the electric motor/generator is used to start and stop the IC engine.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
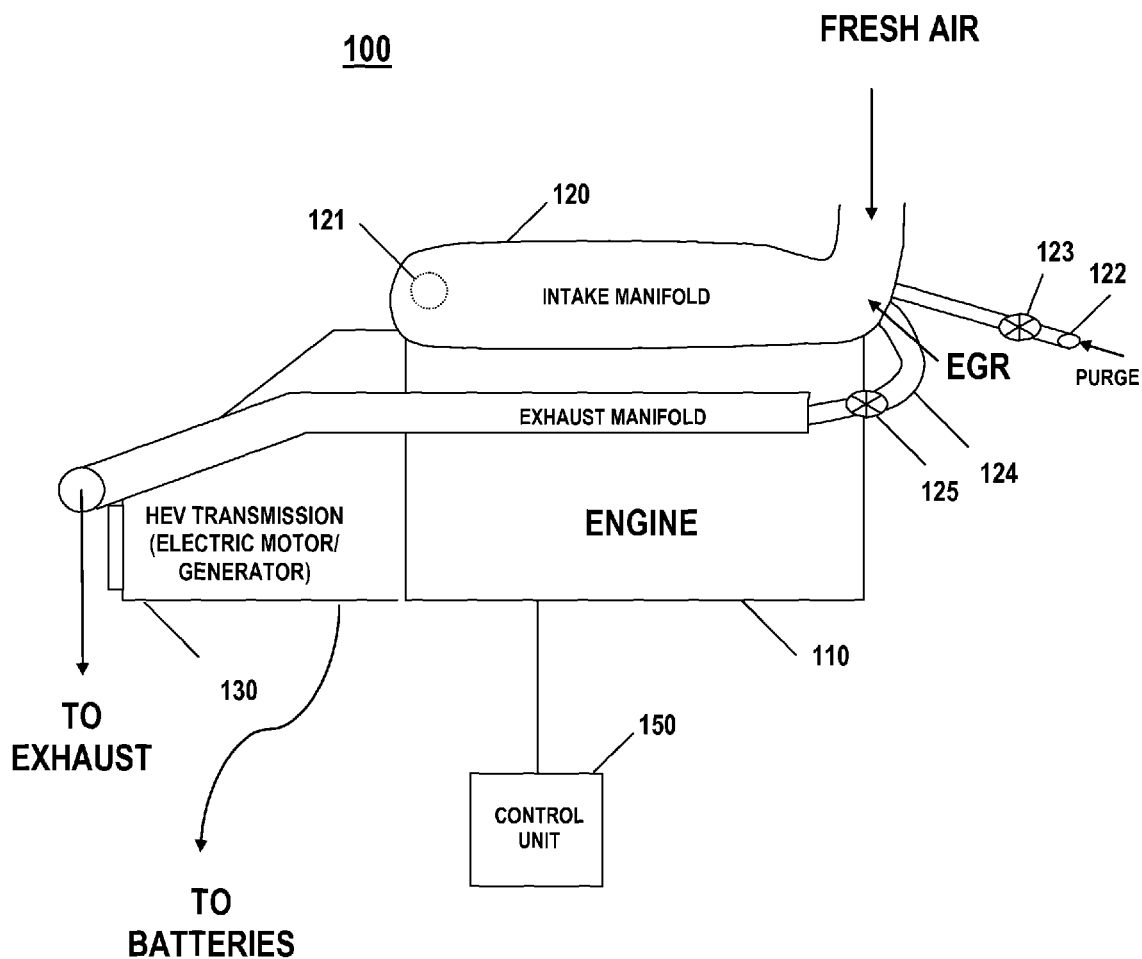
FIG. 1 is a schematic of a hybrid automotive powertrain according to the principles of the present disclosure.

In one form, the present disclosure provides a method for preparing the internal combustion (IC) engine component of a hybrid automotive powertrain for shutdown to achieve "clean" restart, i.e., one with little to no EGR/purge material present in the intake manifold on restart. Clean restart is desired in view of, among other things, the increased emphasis on emissions levels and fuel economy mandated by the U.S. government. There are several advantages to such a method, including improved engine startability due to reduced electrical power requirements, which is critical in hybrid automotive powertrains. Embodiments of the system and method discussed herein are contemplated to be utilized with a variety of hybrid powertrain configurations utilizing in addition to an IC engine, a secondary energy source such as an electrical motor/generator, battery, flywheel, and fluid (e.g. hydraulic) pressure/pumps, accumulators etc.

Generally, to ensure a clean restart of an IC engine, it is necessary to flush the intake manifold with fresh air to remove the EGR and purge material. Thus, when an engine stop directive is delivered to the IC engine from a hybrid powertrain control system, the IC engine will be directed to disconnect EGR and purge material inflow and complete a number of cycles to ensure that EGR and purge material in the intake manifold are removed. Disconnecting EGR or purge is done by, e.g., turning the EGR/purge system off or closing, disabling one or more components such as, one or more valves connecting EGR/purge material inflow to the intake manifold.

The number of cycles that the IC engine is run with EGR and purge inflow off can be determined in advance as a function of the intake manifold size and air intake volume per cycle. Once the IC engine is filled with a desirable amount of fresh air (i.e., on completion of the determined number of cycles), the engine will be directed to stop. With an intake manifold having undesirable material substantially removed, the IC engine is prepped for a next, clean, start.

Although the number of cycles can generally be estimated as a function of intake manifold size and air intake volume per cycle, this does not take into account a number of other variables, such as a concentration of EGR or purge material present in the manifold at the time of the directed stop or inflow air quality. Optionally, EGR and purge material levels or inflow air quality levels can be measured or estimated by one or more sensors in the intake manifold. For instance, temperature sensors can determine a differential temperature between outside air and the air mixture in the intake manifold. Composition sensors can detect the presence or concentration of known components of EGR or purge material. Data from these sensors could be used to provide an on-the-fly calculation of cycles needed to clear the intake manifold, potentially reducing the number of run cycles necessary.

Optionally, it should also be noted that if the intake manifold is already substantially empty, i.e., air pressure or a concentration within the manifold is below a threshold, then clearing the manifold may not be necessary. A logic step can be implemented to check whether the manifold is empty or below a threshold before executing the run cycles.

In an exemplary embodiment, FIG. 1 illustrates a schematic of a hybrid automotive powertrain 100. The powertrain 100 includes an internal combustion (IC) engine 110 and hybrid electric vehicle (HEV) transmission/electric generator 130. Connected to an intake manifold 120 of the IC engine 110 are a canister 122 and a purge valve 123 and an exhaust gas recirculation (EGR) subsystem 124 including a valve 125. EGR subsystem 124 may include piping, valves, sensors for directing exhaust gas. Optional temperature, composition, or pressure sensors can be installed as part of intake manifold 120. In normal operation, fresh air enters the intake manifold 120 where it is drawn into the IC engine 110. In order to reduce throttling losses, heat rejection, and/or chemical disassociation, the EGR subsystem 124 directs exhaust gas into the intake manifold to displace an amount of combustible matter entering the IC engine 110's cylinders. Likewise, purge material is directed into intake manifold 120 via canister/valve 122/123. A control unit 150 is operably connected to the IC engine 110, HEV transmission/electric motor/generator 130, canister/valve 122/123 and EGR subsystem/valve 124/125 and operates to control the various components of powertrain 100, including the start/stop functionality of the IC engine 110.

Figure 2:
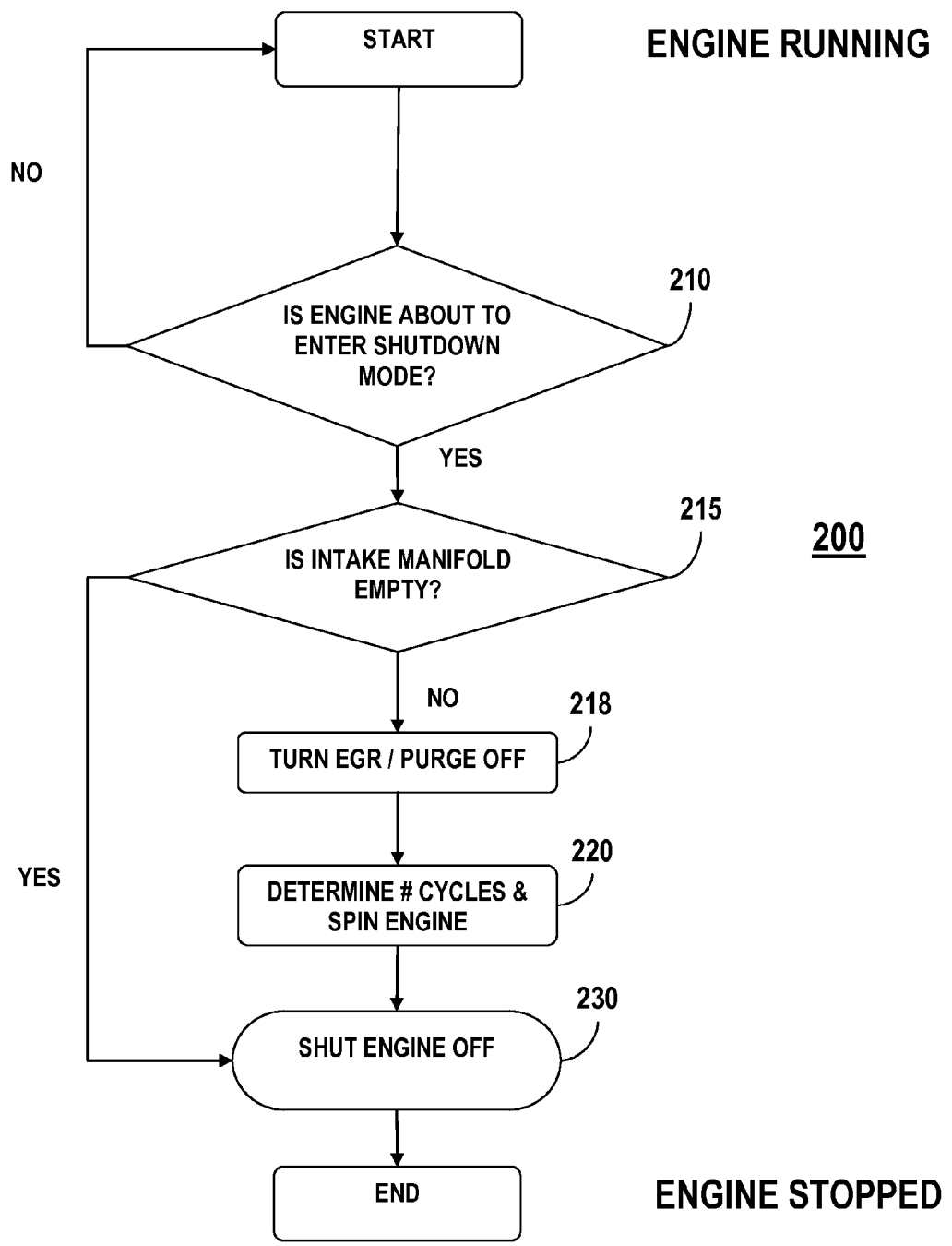
FIG. 2 is a flow diagram of a method for preparing the internal combustion engine component of a hybrid automotive powertrain for shutdown according to the principles of the present disclosure.

FIG. 2 shows a flow chart of a method 200 for preparing the IC engine 110 of powertrain 100 for shutdown so as to ensure clean restart by substantially emptying the intake manifold 120 of EGR and/or purge material. At step 210, the control unit 150 determines if the IC engine 110 is about to enter a shutdown mode. When control unit 150 determines that the IC engine 110 is about to enter a shutdown mode, the control unit 150 will disconnect EGR and/or purge inflow to the intake manifold 120 (step 218). This can be accomplished by turning off the EGR subsystem 124, e.g. closing valve 125. Likewise, purge inflow can be stopped by closing valve 123. At step 220, the control unit 150 determines a number of engine run cycles to fill the intake manifold of the IC engine with clean air and then runs or spins the IC engine 110 for the determined number of cycles to clear the intake manifold 120 before the IC engine 110 enters the shutdown mode. Once the IC engine 110 has been spun the required number of cycles, the control unit 150 shuts the IC engine 110 down (step 230).

The number of engine cycles necessary to prepare the intake manifold 120 for clean restart can be hard-wired into the control unit 150, for example, as a function of the size of the intake manifold 120 and air intake per engine cycle, engine displacement, air flow, control strategy (e.g. time limits, rates, components monitored), or the like. Optionally, sensors 121 in the intake manifold 120 can allow control unit 150 to determine the proper number of cycles on the fly. For instance, a sensor 121 may provide temperature information that allows control unit 150 to properly estimate the amount of EGR/purge material in the intake manifold 120. Other types of information that could be provided by sensor 121 include pressure, temperature, duration of component/vehicle operation and chemical composition information. For example and in some embodiments, operation duration may be a factor considered by the controller to determine the number of engine run cycles to fill the intake manifold with clean air such as when the vehicle has been operated for a short time, e.g. less than 5 minutes, time since last operation and current operation duration, where it may not be necessary to engage the EGR or purge.

By way of further example, the control unit 150 would sample the intake manifold 120 for concentration of hydrocarbons and calibrate a run cycle number in tables based on number of engine rotations/volume to achieve a clean cycle point.

An intermediate step (step 215) can be performed to check to see if the intake manifold 120 is emptied to or below a predetermined level. If the intake manifold 120 is emptied to a predetermined level, the IC engine 110 can be shut down immediately (step 230). Information from an optional sensor 121 can be used to make this determination, i.e., by evaluating a pressure level in the intake manifold 120 and comparing that level to a threshold a pressure level.

As described hereinabove, the step of determining the number of engine run cycles to fill the intake manifold with clean air before engine shutdown may depend on the factors above. In some exemplary embodiments the determined number of engine run cycles may be from 5 to 15 cycles. In another exemplary embodiment, the determined engine run cycles may be from 10 to 20 cycles. In yet another exemplary embodiment, the determined engine run cycles may be from 10 to 25 cycles.

What is claimed is:

1. A method for preparing an internal combustion (IC) engine component of a hybrid automotive powertrain for shutdown so as to enable clean restart comprising:
   determining if the IC engine is about to enter a shutdown mode;
   determining a number of engine run cycles to fill an intake manifold of the IC engine with clean air, if it is determined the IC engine is about to enter the shutdown mode; and
   running the IC engine for the determined number of cycles to fill the intake manifold of the IC engine with clean air before shutting the IC engine down.

2. The method of claim 1, further comprising disconnecting an exhaust gas recirculation subsystem and a purge inflow that are connected to the intake manifold before running the engine for the determined number of cycles.

3. The method of claim 2, wherein the disconnecting comprises closing one or more valves to prevent exhaust gas recirculation and purge material from reaching the intake manifold.

4. The method of claim 2, wherein the disconnecting comprises disabling a component of the exhaust gas recirculation subsystem.

5. The method of claim 1, wherein the number of cycles is determined as a function of intake manifold size.

6. The method of claim 5, wherein the number of cycles is further determined as a function of air intake volume per cycle.

7. The method of claim 1, further comprising determining a concentration of EGR and/or purge material present in the manifold at the time of determining if the IC engine is about to enter a shutdown mode.

8. The method of claim 7, further comprising selecting the determined number of cycles as a function of the determined concentration of the EGR and/or the purge material.

9. The method of claim 1, wherein the step of determining if the IC engine is about to enter the shutdown mode is performed by a control unit of the hybrid automotive powertrain.

10. The method of claim 1, further including determining if the intake manifold is substantially empty before running the IC engine for the determined number of cycles.

11. The method of claim 10, wherein determining if the intake manifold is substantially empty comprises determining whether an air pressure level in the intake manifold exceeds a threshold pressure level.

12. A hybrid automotive powertrain system comprising:
an electric generator;
an internal combustion (IC) engine comprising an intake manifold;
an exhaust gas recirculation (EGR) subsystem connected to the intake manifold; and
a control unit connected to the IC engine, electric generator, and the exhaust gas recirculation subsystem and operable to control start/stop functionality of the IC engine such that when it is determined that the IC engine is about to enter a shutdown mode, the control unit is operable to run the IC engine for a determined number of cycles to fill the intake manifold with clean air before shutting the IC engine down.

13. The system of claim 12, further including a sensor in the intake manifold connected to the control unit operable to determine the concentration of EGR present in the manifold at the time of the determined shutdown.

14. The system of claim 13, wherein the control unit is further operable to select the determined number of cycles as a function of the determined concentration of EGR.

15. The system of claim 12, wherein the control unit is further operable to disconnect exhaust gas recirculation and/or purge material inflow to the intake manifold before running the engine for the determined number of cycles.

16. The system of claim 15, wherein the disconnecting comprises disabling a component to prevent inflow to the intake manifold from the EGR subsystem or purge.

17. The system of claim 15, further comprising a valve between the EGR subsystem and intake manifold, wherein the disconnecting comprises closing the valve.

18. The system of claim 12, wherein the control unit is further operable to determine if an intake manifold of the IC engine is substantially empty before running the IC engine for the determined number of cycles.

19. The system of claim 12, wherein power from the electric generator is used to start and stop the IC engine.

20. The system of claim 12, further comprising a purge valve and canister connected to the intake manifold.

* * * * *